United States Patent
Ueda et al.

(10) Patent No.: US 10,774,243 B2
(45) Date of Patent: Sep. 15, 2020

(54) METHOD FOR MODIFYING CARBON NANOTUBE SHEET, MODIFIED CARBON NANOTUBE SHEET, METHOD FOR MANUFACTURING ADHESIVE SHEET, AND ADHESIVE SHEET

(71) Applicants: LINTEC CORPORATION, Tokyo (JP); LINTEC OF AMERICA, INC., Phoenix, AZ (US)

(72) Inventors: Takahiro Ueda, Tokyo (JP); Masaharu Ito, Phoenix, AZ (US); Kanzan Inoue, Phoenix, AZ (US)

(73) Assignees: LINTEC CORPORATION, Tokyo (JP); LINTEC OF AMERICA, INC., Phoenix, AZ (US)

( * ) Notice: Subject to any disclaimer, the term of this patent is extended or adjusted under 35 U.S.C. 154(b) by 117 days.

(21) Appl. No.: 16/096,610

(22) PCT Filed: Apr. 28, 2017

(86) PCT No.: PCT/JP2017/016904
§ 371 (c)(1),
(2) Date: Oct. 25, 2018

(87) PCT Pub. No.: WO2017/191812
PCT Pub. Date: Nov. 9, 2017

(65) Prior Publication Data
US 2019/0136094 A1    May 9, 2019

Related U.S. Application Data

(60) Provisional application No. 62/330,670, filed on May 2, 2016.

(51) Int. Cl.
*C09J 7/00* (2018.01)
*C09J 9/00* (2006.01)
(Continued)

(52) U.S. Cl.
CPC .............. *C09J 7/29* (2018.01); *C01B 32/168* (2017.08); *C09J 7/20* (2018.01); *C09J 7/385* (2018.01);
(Continued)

(58) Field of Classification Search
CPC ......... C09J 7/00; C09J 7/20; C09J 7/29; C09J 7/30; C09J 7/38; C09J 7/385; C09J 9/00;
(Continued)

(56) References Cited

U.S. PATENT DOCUMENTS 8,879,757 B2    11/2014  Wei et al.
8,926,933 B2    1/2015   Zhang et al.
(Continued)

FOREIGN PATENT DOCUMENTS

JP    2008-523254 A    7/2008
JP    2009-208975 A    9/2009
(Continued)

OTHER PUBLICATIONS

International Preliminary Report on Patentability dated Nov. 6, 2018 issued in corresponding International Application No. PCT/JP2017/016904, including English translation of Written Opinion of the International Searching Authority.
(Continued)

*Primary Examiner* — Jacob T Minskey
*Assistant Examiner* — Matthew Hoover
(74) *Attorney, Agent, or Firm* — McDermott Will & Emery LLP

(57) ABSTRACT

$L_1$ is a maximum distance across a non-contacting section between intersection points of a straight line crossing the non-contacting section in parallel with an alignment direction of a carbon nanotubes in a plan view of a mounting section with a border between the non-contacting section and a contacting section. $L_2$ is a maximum distance across
(Continued)

the non-contacting section between intersection points of a straight line crossing the non-contacting section and intersecting the alignment direction of the carbon nanotubes in the plan view of the mounting section with the border between the non-contacting section and the contacting section. When $L_1$ is larger than $L_2$, at least $L_2$ is more than 0 mm and less than 10 mm. When smaller, at least $L_1$ is more than 0 mm and less than 10 mm. When equal, $L_1$ and $L_2$ are each more than 0 mm and less than 10 mm.

9 Claims, 7 Drawing Sheets

(51) Int. Cl.
    *C01B 32/00*     (2017.01)
    *C09J 201/00*     (2006.01)
    *C09J 7/29*     (2018.01)
    *C01B 32/168*     (2017.01)
    *C09J 7/20*     (2018.01)
    *C09J 7/38*     (2018.01)
    *C09J 9/02*     (2006.01)

(52) U.S. Cl.
CPC ............... *C09J 9/02* (2013.01); *C09J 201/00* (2013.01); *C01B 2202/08* (2013.01); *C09J 2205/106* (2013.01); *C09J 2400/123* (2013.01); *C09J 2433/00* (2013.01)

(58) Field of Classification Search
CPC .......... C09J 9/02; C09J 201/00; C01B 32/00; C01B 32/10; C01B 32/16; C01B 32/168
See application file for complete search history.

(56) References Cited

U.S. PATENT DOCUMENTS

| | | | |
|---|---|---|---|
| 9,481,949 B2 | 11/2016 | Zhang et al. | |
| 9,512,545 B2 | 12/2016 | Zhang et al. | |
| 9,605,363 B2 | 3/2017 | Zhang et al. | |
| 9,631,301 B2 | 4/2017 | Zhang et al. | |
| 9,688,536 B2 | 6/2017 | Zhang et al. | |
| 9,815,699 B1 | 11/2017 | Zhang et al. | |
| 9,845,554 B2 | 12/2017 | Zhang et al. | |
| 9,862,607 B2 | 1/2018 | Zhang et al. | |
| 9,944,529 B2 | 4/2018 | Zhang et al. | |
| 10,562,775 B2 * | 2/2020 | Ovalle | C01B 32/168 |
| 2008/0170982 A1 | 7/2008 | Zhang et al. | |
| 2008/0248235 A1 * | 10/2008 | Feng | B82Y 30/00 428/113 |
| 2009/0233058 A1 | 9/2009 | Hata et al. | |
| 2011/0111177 A1 * | 5/2011 | Hata | B81C 1/0038 428/161 |
| 2011/0318256 A1 | 12/2011 | Nakayama et al. | |
| 2012/0298618 A1 | 11/2012 | Jiang et al. | |
| 2014/0140545 A1 | 5/2014 | Wei et al. | |
| 2015/0147573 A1 | 5/2015 | Zhang et al. | |
| 2015/0308018 A1 | 10/2015 | Zhang et al. | |
| 2016/0083872 A1 | 3/2016 | Zhang et al. | |
| 2016/0251778 A1 | 9/2016 | Zhang et al. | |
| 2016/0273133 A1 | 9/2016 | Zhang et al. | |
| 2016/0312387 A1 | 10/2016 | Zhang et al. | |
| 2017/0001866 A1 | 1/2017 | Zhang et al. | |
| 2017/0096750 A1 | 4/2017 | Zhang et al. | |
| 2017/0137290 A1 | 5/2017 | Zhang et al. | |
| 2017/0327377 A1 | 11/2017 | Zhang et al. | |

FOREIGN PATENT DOCUMENTS

| | | |
|---|---|---|
| JP | 2010-215437 A | 9/2010 |
| JP | 2012-246210 A | 12/2012 |
| JP | 2014-103649 A | 6/2014 |
| WO | 2009/107846 A1 | 9/2009 |
| WO | 2016/080526 A1 | 5/2016 |

OTHER PUBLICATIONS

International Search Report issued in corresponding International Patent Application No. PCT/JP2017/016904, dated Jun. 13, 2017, with English Translation.

Extended European Search Report issued in corresponding European Patent Application No. 17792745.6, dated Nov. 26, 2019.

* cited by examiner

METHOD FOR MODIFYING CARBON NANOTUBE SHEET, MODIFIED CARBON NANOTUBE SHEET, METHOD FOR MANUFACTURING ADHESIVE SHEET, AND ADHESIVE SHEET

CROSS REFERENCE

This application is the U.S. National Phase under 35 U.S.C. § 371 of International Application No. PCT/JP2017/016904, filed on Apr. 28, 2017, which claims the benefit of U.S. Provisional Patent Application No. 62/330,670, filed on May 2, 2016, the entire contents of each are hereby incorporated by reference.

TECHNICAL FIELD

The present invention relates to a modification method of a carbon nanotube sheet, a modified carbon nanotube sheet, a production method of an adhesive sheet, and an adhesive sheet.

BACKGROUND ART

Heretofore, a sheet using carbon nanotubes has been known. Such a carbon nanotube sheet possesses unique characteristics such as electrical conductivity, exothermicity and in-plane anisotropy.

For instance, Patent Literature 1 discloses a nanofiber sheet including carbon nanotubes.

CITATION LIST

Patent Literature(s)

Patent Literature 1: JP 2008-523254 A

SUMMARY OF THE INVENTION

Problem(s) to be Solved by the Invention

Incidentally, in order to modify a carbon nanotube sheet depending on the intended use, for example, the carbon nanotube sheet is occasionally subjected to a treatment such as exposure to liquid vapor.

However, when the carbon nanotube sheet is subjected to such treatment in a free-standing (self-supported) state, there arises a problem that the carbon nanotube sheet shrinks in a direction perpendicular to a fiber axis (i.e., in an alignment direction of the carbon nanotubes) (i.e., in a width direction of the carbon nanotube sheet) in a plan view.

An object of the invention is to provide a modification method for preventing shrinkage of a carbon nanotube sheet in a width direction thereof at the time of subjecting the carbon nanotube sheet to treatment such as exposure to liquid vapor. Another object of the invention is to provide a modified carbon nanotube sheet obtained by the modifying method. Still another object of the invention is to provide a production method of an adhesive sheet using the modified carbon nanotube sheet obtained by the modifying method. A further object of the invention is to provide an adhesive sheet using the modified carbon nanotube sheet obtained by the modifying method.

Means for Solving the Problems

According to an aspect of the invention, a modification method of a carbon nanotube sheet includes: mounting at least one carbon nanotube sheet on an assembly; and exposing the carbon nanotube sheet on the assembly to steam or particles of a substance that is liquid at room temperature. The carbon nanotube sheet has a structure in which a plurality of carbon nanotubes are aligned preferentially in one direction in a plane of the sheet. The assembly includes a mounting section on which the carbon nanotube sheet is mounted. The mounting section includes a non-contacting section that is not brought into contact with the carbon nanotube sheet and a contacting section that is brought into contact with the carbon nanotube sheet. $L_1$ is defined by a maximum distance in the non-contacting section between intersection points of a straight line extending across the non-contacting section in parallel with an alignment direction of the carbon nanotubes in a plan view of the mounting section with a border between the non-contacting section and the contacting section, while $L_2$ is defined by a maximum distance in the non-contacting section between intersection points of a straight line extending across the non-contacting section and intersecting with the alignment direction of the carbon nanotubes in the plan view of the mounting section with the border between the non-contacting section and the contacting section. When $L_1$ is larger than $L_2$, at least $L_2$ is more than 0 mm and less than 10 mm, when $L_1$ is smaller than $L_2$, at least $L_1$ is more than 0 mm and less than 10 mm, and when $L_1$ is equal to $L_2$, each of $L_1$ and $L_2$ is more than 0 mm and less than 10 mm.

In the above arrangement, it is preferable that at least one of the non-contacting section and the contacting section is separately disposed at plural positions.

In the above arrangement, it is preferable that the non-contacting section includes a plurality of continuous non-contacting sections and the contacting section includes a plurality of continuous contacting sections.

In the above arrangement, it is preferable that the non-contacting section of the assembly has fine pores.

In the above arrangement, it is preferable that the assembly includes a bumpy structure as the contacting sections.

In the above arrangement, it is preferable that the maximum distance $L_1$ is more than 0 mm and less than 10 mm in the assembly.

In the above arrangement, the assembly preferably includes a plurality of continuous contacting sections and a plurality of continuous non-contacting sections. Preferably, the continuous contacting sections and the continuous non-contacting sections form a striped arrangement, in which a maximum distance between closest two points, one of the two points being a point on one of facing ends of adjacent ones of the continuous contacting sections and the other of the two points being a point on the other one of the facing ends, is always less than 10 mm, and the striped arrangement crosses the alignment direction of the carbon nanotubes in the plan view.

In the above arrangement, the carbon nanotube sheet including a plurality of carbon nanotube sheets may be laminated on the assembly, and then the plurality of carbon nanotube sheets on the assembly may be exposed to the steam or particles of the substance that is liquid at room temperature.

In the above arrangement, it is preferable that the light transmissivity of a modified carbon nanotube sheet is 70% or more.

According to another aspect of the invention, the carbon nanotube sheet is the modified carbon nanotube sheet obtained by the modification method of the carbon nanotube sheet according to any one of the above aspects of the invention. Light transmissivity of the modified carbon nanotube sheet is 70% or more.

In the above arrangement, a carbon nanotube sheet is laminated on an adhesive agent layer containing an adhesive agent. The carbon nanotube sheet is the modified carbon nanotube sheet obtained by the modification method of the carbon nanotube sheet according to any one of the above aspects of the invention, and an adhesive force of the adhesive sheet measured after a surface of the modified carbon nanotube sheet opposite to a surface on which the adhesive agent layer is formed is stuck to an adherend is 8 N/25 mm or more.

In the above arrangement, an adhesive sheet includes: a carbon nanotube sheet; and an adhesive agent layer containing an adhesive agent. The carbon nanotube sheet is a modified carbon nanotube sheet obtained by the modification method according to any one of aspects of the invention. An adhesive force of the adhesive sheet measured after a surface of the modified carbon nanotube sheet opposite to a surface on which the adhesive agent layer is formed is stuck to an adherend is 8 N/25 mm or more.

According to an aspect of the invention, it is possible to provide the modification method for preventing shrinkage of the carbon nanotube sheet in the width direction thereof at the time of subjecting the carbon nanotube sheet to treatment such as exposure to liquid vapor. Further, according to another aspect of the invention, it is possible to provide the modified carbon nanotube sheet obtained by the modification method. Furthermore, according to a still another aspect of the invention, it is possible to provide the production method of an adhesive sheet using the modified carbon nanotube sheet obtained by the modification method. Furthermore, according to a further aspect of the invention, it is possible to provide the adhesive sheet using the modified carbon nanotube sheet obtained by the modification method.

BRIEF DESCRIPTION OF DRAWING(S)

FIG. 1 schematically illustrates an example of assemblies according to a first exemplary embodiment of the invention.

FIG. 2 schematically illustrates another example of assemblies according to the first exemplary embodiment.

Figure 6:
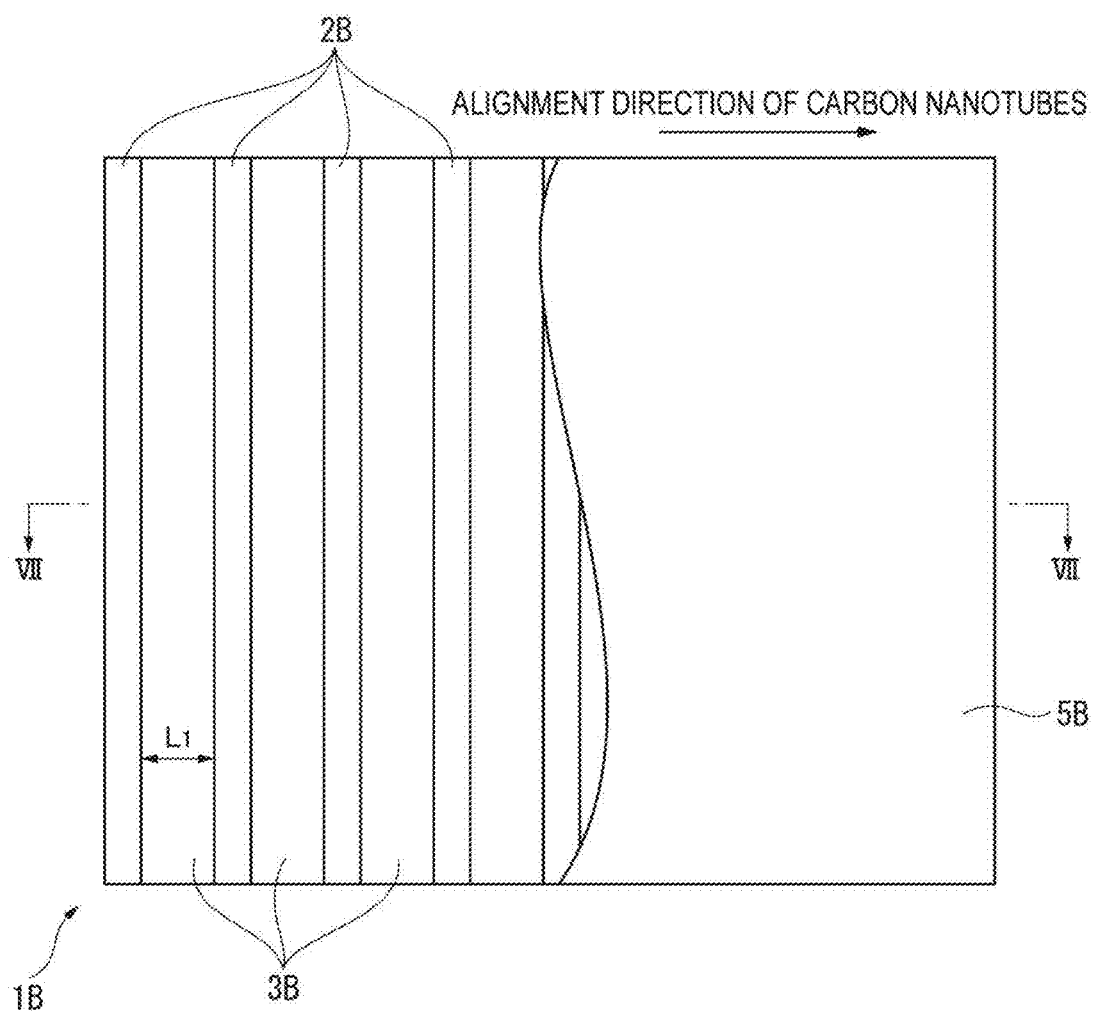

FIG. 6 schematically illustrates an example of assemblies according to a second exemplary embodiment of the invention.

Figure 7:
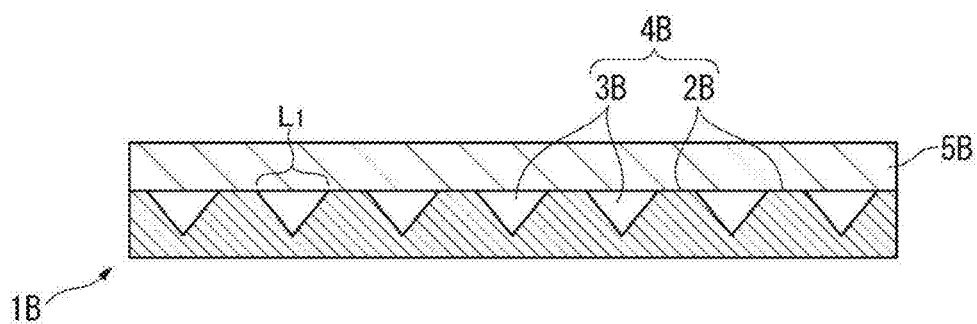

FIG. 7 is a cross-sectional view taken along a line VII-VII in FIG. 6.

DESCRIPTION OF EMBODIMENT(S)

First Exemplary Embodiment

Modification Method

A modification method of a carbon nanotube sheet of a first exemplary embodiment (hereinafter, also referred to as "the present modification method") will be described hereinbelow.

The present modification method includes a process of mounting one or two or more carbon nanotube sheets on an assembly (hereinafter, also referred to as "mounting process" for the sake of the convenience) and a process of exposing the carbon nanotube sheet on the assembly to steam or particles of a substance that is liquid at room temperature (hereinafter, also referred to as "exposure process" for the sake of the convenience).

Hereinbelow, a carbon nanotube sheet according to the first exemplary embodiment will be described at first, and then each process of the present modification method will be described.

Carbon Nanotube Sheet

The carbon nanotube sheet of the first exemplary embodiment has a structure in which a plurality of carbon nanotubes are preferentially aligned in one direction defined in a plane of the sheet.

It should be noted that "the structure in which the carbon nanotubes are aligned in one direction defined in a plane of the sheet" herein means that the carbon nanotubes are aligned along one direction defined in a plane of the sheet. For instance, longitudinal axes of the carbon nanotubes are aligned in parallel with one direction defined in a plane of the sheet.

Further, "the carbon nanotubes are preferentially aligned" herein means that the aligned state of the carbon nanotubes is mainstream. For instance, when the longitudinal axes of the carbon nanotubes are aligned in parallel with one direction defined in a plane of the sheet as described above, the longitudinal axes of a part of the carbon nanotubes need not be aligned in parallel with one direction defined in a plane of the sheet as long as the aligned state of the carbon nanotubes is mainstream.

The carbon nanotube sheet is produced by, for instance, drawing carbon nanotubes agglomerated by an intermolecular force into a sheet from a carbon nanotube forest (i.e., a grown form, which is occasionally referred to as "array", of a plurality of carbon nanotubes grown on a substrate to be vertically aligned relative to a principal surface of the substrate) and separating the drawn carbon nanotubes from the substrate.

Mounting Process

In the mounting process, the carbon nanotube sheet is mounted on the assembly. At this time, a single-layered carbon nanotube sheet may be mounted on the assembly, or a multi-layered sheet obtained by preliminarily laminating a plurality of carbon nanotube sheets may be mounted on the assembly.

The assembly according to the present modification method includes a mounting section on which the carbon nanotube sheet is mounted.

The mounting section of the assembly has a non-contacting section that is not brought into contact with the carbon nanotube sheet and a contacting section that is brought into contact with the carbon nanotube sheet. A straight line extending in parallel with the alignment direction of the carbon nanotubes in a plan view of the mounting section and crossing over the non-contacting section defines intersection points across the non-contacting section with a border between the non-contacting section and the contacting section. A maximum distance between the intersection points is denoted by $L_1$. A straight line intersecting with the alignment direction of the carbon nanotubes in the plan view of the mounting section and crossing over the non-contacting section defines intersection points across the non-contacting section with the border between the non-contacting section and the contacting section. A maximum distance between the intersection points is denoted by $L_2$. When $L_1$ is larger than $L_2$, at least $L_2$ is more than 0 mm and less than 10 mm.

When $L_1$ is smaller than $L_2$, at least $L_1$ is more than 0 mm and less than 10 mm. When $L_1$ is equal to $L_2$, each of $L_1$ and $L_2$ is more than 0 mm and less than 10 mm.

According to the first exemplary embodiment, when $L_1$ is larger than $L_2$, at least $L_2$ is preferably more than 10 μm and 5 mm or less, more preferably 50 μm or more and 2 mm or less, and further preferably 100 μm or more and 1.5 mm or less.

According to the first exemplary embodiment, when $L_1$ is smaller than $L_2$, at least $L_1$ is preferably more than 10 μm and 5 mm or less, more preferably 50 μm or more and 2 mm or less, and further preferably 100 μm or more and 1.5 mm or less.

According to the first exemplary embodiment, when $L_1$ is equal to $L_2$, each of $L_1$ and $L_2$ is preferably more than 10 μm and 5 mm or less, more preferably 50 μm or more and 2 mm or less, and further preferably 100 μm or more and 1.5 mm or less.

According to the first exemplary embodiment, at least one of the non-contacting section and the contacting section is separately disposed at plural positions.

When the mounting section of the assembly has the non-contacting section separately disposed at plural positions, the shape of the non-contacting section is not particularly limited. The shape of the non-contacting section may be, for example, a square, oblong, rectangle, circle, oval, honeycomb, comb teeth, linear, curved, wavy (e.g., sine curve) and a net consisting of polygons, or the non-contacting section may be in an irregular shape. Alternatively, as described later, the non-contacting section may have fine pores.

When the mounting section of the assembly has the contacting section separately disposed at plural positions, it is preferable that the minimum distance between adjacent ones of the separately disposed contacting sections (i.e., a distance of closest approach between ends of the adjacent contacting sections) in a plane of the sheet in the plan view of the mounting section is more than 0 mm and less than 10 mm. In the carbon nanotube sheet, the plurality of carbon nanotubes which are preferentially aligned in one direction defined in a plane of the sheet are bundled around the alignment direction in the exposure process described later. Since the plurality of contacting sections which are separated from each other are densely present along the alignment direction, a distance between ends of the sheet fixed by the contacting sections at the time of bundling the carbon nanotubes is reduced. As a result, the number of the carbon nanotubes to be bundled becomes appropriate, and a uniform distribution of the carbon nanotubes is easily maintained. It is preferable that the minimum distance between adjacent ones of the separately disposed contacting sections in the plan view of the mounting section is more than 10 μm and 5 mm or less, more preferably 50 μm or more and 2 mm or less, further preferably 100 μm or more and 1.5 mm or less. The shape of the contacting section is not particularly limited. The shape of the contacting section may be, for example, a square, oblong, rectangle, circle, oval, curved, wavy (e.g., sine curve) and polygon, or the contacting section may be in an irregular shape.

Here, "bundling" means a state that the plurality of carbon nanotubes close to each other constituting the carbon nanotube sheet are bundled (i.e., gathered into the form of fibers).

Hereinafter, the treatment of bundling the carbon nanotubes of the carbon nanotube sheet will be referred to as "bundling treatment".

Figure 1:
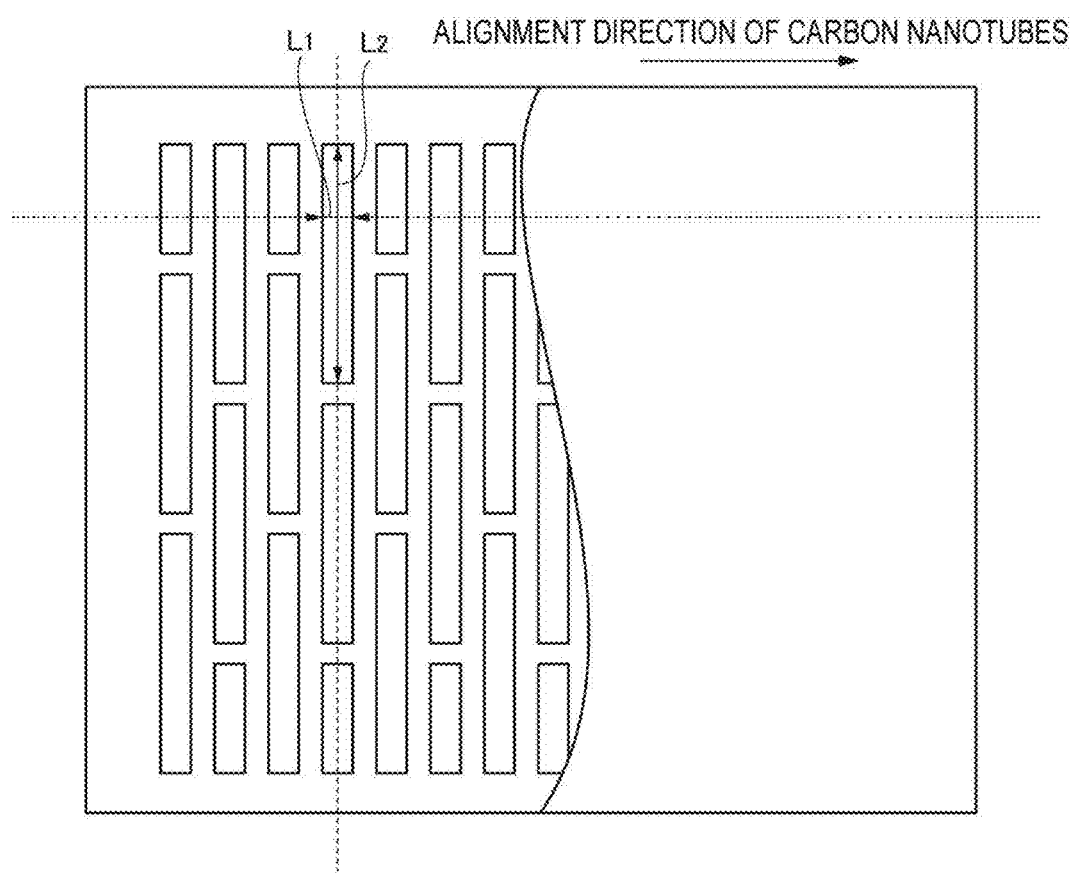

In the assembly according to the present modification method, it is preferable that the maximum distance $L_2$ is defined on a straight line intersecting with the alignment direction of the carbon nanotubes in the carbon nanotube sheet with an angle in a range from 60 to 90 degrees in the plan view of the mounting section and the maximum distance $L_2$ is more than 0 mm and less than 10 mm. It is more preferable that the maximum distance $L_2$ is defined on a straight line substantially perpendicular to the alignment direction of the carbon nanotubes in the carbon nanotube sheet (i.e., intersecting with the alignment direction of the carbon nanotubes in the carbon nanotube sheet with an angle in a range from 80 to 90 degrees) (see FIG. 1 regarding the case of 90 degrees) and the maximum distance $L_2$ is more than 0 mm to less than 10 mm.

In the assembly according to the present modification method, the maximum distance $L_1$ is preferably more than 0 mm and less than 10 mm. Specifically, in the assembly, the maximum distance between the adjacent contacting sections (i.e., the widest gap between the ends of the adjacent contacting sections) in the alignment direction of the carbon nanotubes is preferably more than 0 mm and less than 10 mm. In other words, a length of a straight line segment, which is randomly drawn on the surface of the assembly so as to be in parallel with the alignment direction of the carbon nanotubes, between the adjacent contacting sections is preferably more than 0 mm and less than 10 mm (see FIG. 1). In the carbon nanotube sheet, a plurality of carbon nanotubes which are preferentially aligned in one direction defined in a plane of the sheet are bundled around the alignment direction in the exposure process described later. Since the distance between the adjacent contacting sections in the alignment direction is less than 10 mm, the distance between the ends of the sheet fixed by the contacting sections at the time of bundling the plurality of carbon nanotubes is reduced. As a result, the number of the carbon nanotubes to be bundled becomes appropriate, and a uniform distribution of the carbon nanotubes is easily maintained. The maximum distance between the adjacent contacting sections in the alignment direction of the carbon nanotubes is preferably more than 10 μm and 5 mm or less, more preferably 50 μm or more and 2 mm or less, further preferably 100 μm or more and 1.5 mm or less.

Further, as described later, the bundling of the carbon nanotubes is not performed in the carbon nanotube sheet corresponding to the contacting sections in the exposure process. Accordingly, in order to increase the ratio of the area subjected to the bundling treatment relative to the total area of the carbon nanotube sheet, it is necessary to relatively reduce the area of the contacting sections in the assembly. In view of the above, the distance between the adjacent non-contacting sections in the alignment direction of the carbon nanotubes is preferably more than 0 mm and less than 5 mm. Specifically, a length of a straight line segment, which is randomly drawn on the surface of the assembly (i.e., surface having the mounting section) so as to be in parallel with the alignment direction of the carbon nanotubes, between the adjacent non-contacting sections is preferably more than 0 mm and less than 5 mm. The distance between the adjacent non-contacting sections in the alignment direction of the carbon nanotubes is preferably more than 10 μm and 2 mm or less, more preferably 50 μm or more and 1 mm or less, and further preferably 100 μm or more and 500 μm or less.

It should be noted that "a straight line segment which is randomly drawn on the surface of the assembly so as to be in parallel with the alignment direction of the carbon nanotubes" herein includes a straight line segment which is randomly drawn on only part of the surface of the assembly so as to be in parallel with the alignment direction of the carbon nanotubes as long as an effect of the invention can be achieved.

In the assembly according to the present modification method, each of the maximum distances $L_1$ and $L_2$ is preferably more than 0 mm and less than 10 mm.

As the assembly according to the present modification method, an assembly in which each of the non-contacting sections has fine pores is used, for example.

It should be noted that "fine pore" herein means pores each having an opening diameter (minimum diameter) of less than 10 mm. Although an assembly in which each of the non-contacting sections has fine pores may be adopted in a second exemplary embodiment described later, such an assembly may also be adopted in the first exemplary embodiment so that the assembly in which at least one of the non-contacting section and the contacting section is separately disposed at plural positions can be easily obtained. In order to prevent shrinkage of the carbon nanotube sheet in the width direction, in the first exemplary embodiment, the opening diameter of each of the fine pores is preferably 5 mm or less, more preferably 2 mm or less, further preferably 1.5 mm or less. A lower limit of the opening diameter of the fine pores is not particularly specified, but may be appropriately determined in view of the light transmissivity, adhesive force and the like of the carbon nanotube sheet. However, the lower limit of the opening diameter of the fine pore is 1 μm or more in general, preferably 5 μm or more, more preferably 10 μm or more.

The shape of the opening of the fine pore is not particularly specified.

The maximum diameter of the fine pores is preferably in a range more than 0 mm to less than 10 mm.

The assembly according to the present modification method may be an assembly including a plurality of fine pores and the contacting sections continuous with each other or an assembly including a plurality of fine pores and the contacting sections separated from each other.

It should be noted that, "contacting sections continuous with each other" herein means that the contacting section is not closed by the non-contacting section in a plan view of the mounting section. It should be noted that, "non-contacting sections continuous with each other" herein means that the non-contacting section is not closed by the contacting section in a plan view of the mounting section.

The assembly of the first exemplary embodiment may be in the shape of a mesh, net, punching, embossing, lattice, or combination of them, for example. More specifically, examples of the assembly including the plurality of fine pores and the contacting sections continuous with each other include a sponge, a macroporous material (e.g., pumice, macroporous ceramic and the like), a honeycomb porous assembly and a metal foil processed by punching. In these assemblies, the non-contacting sections each including fine pores are separated from each other.

Additionally, examples of the assembly including the plurality of fine pores and the plurality of contacting sections separated from each other include metal mesh and a planar sphere packing assembly. In these assemblies, the non-contacting sections each including fine pores are continuous with each other.

Incidentally, a known means such as 3D printer may be used to form the assembly including the fine pores.

Figure 2:
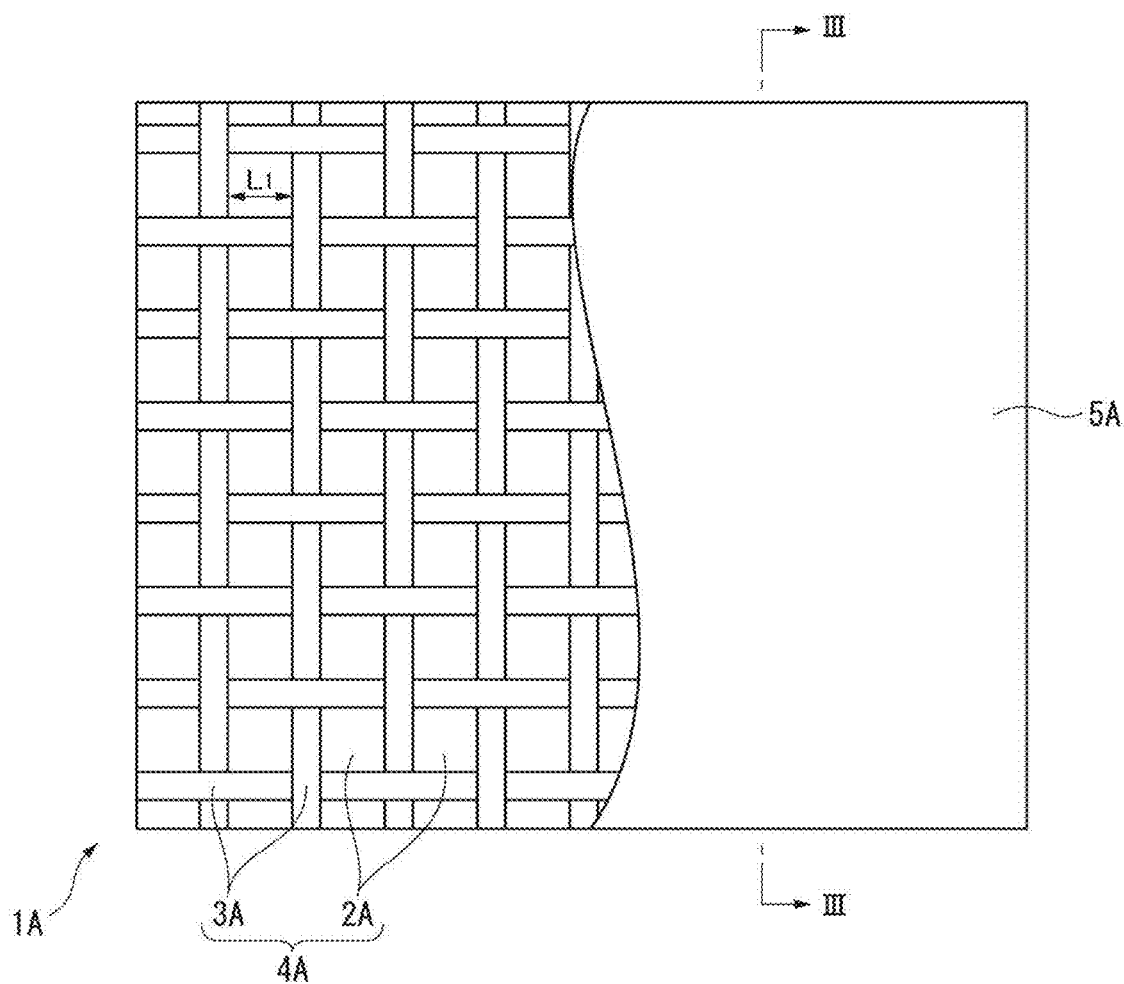

FIG. 2 schematically illustrates another example of assemblies according to the first exemplary embodiment, which is a partially broken view of a carbon nanotube sheet 5A supported by an assembly 1A in the shape of a mesh.

Figure 3:
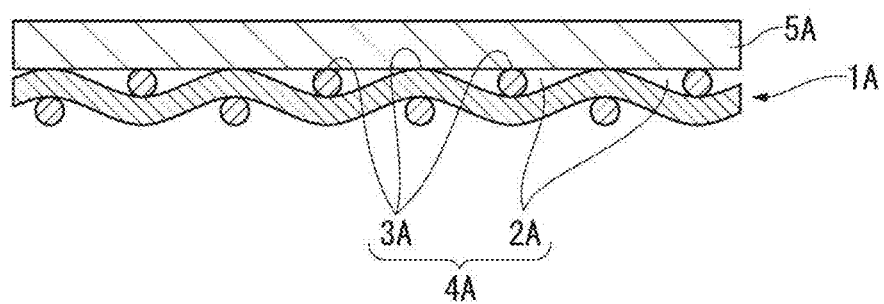
FIG. 3 is a cross-sectional view taken along a line III-III in FIG. 2.

The assembly 1A in the shape of a mesh includes a plurality of fine pores 2A defining a lattice pattern. In FIG. 2, $L_1$ is a minimum diameter (opening diameter) of the fine pore 2A. The assembly 1A in the shape of a mesh has a bumpy structure in which threads constituting the mesh are patterned. The bumpy structure at the side on which the carbon nanotube sheet 5A is mounted defines a contacting section 3A that is in contact with the carbon nanotube sheet 5A (see FIG. 3).

Exposure Process

In the exposure process, the carbon nanotube sheet 5A mounted on the assembly 1A in the shape of a mesh is exposed to steam or particles (aerosol) of a substance that is liquid at a room temperature (referred to as "room-temperature liquid substance" hereinafter).

By the exposure process, the carbon nanotubes of the carbon nanotube sheet 5A can be bundled.

It should be noted that "room temperature" herein means 25 degrees C.

Examples of the room-temperature liquid substances according to the first exemplary embodiment include water and an organic solvent. Examples of the organic solvent include alcohols, ketones and esters. Examples of the alcohols include ethanol, methanol and isopropylalcohol. Examples of the ketones include acetone and methyl ethyl ketone. Examples of the esters include acetic ether.

As a method for exposing the carbon nanotube sheet 5A mounted on the assembly 1A in the shape of a mesh to steam or particles (aerosol) of a room-temperature liquid substance, there are a method in which a room-temperature liquid substance is sprayed onto the carbon nanotube sheet 5A mounted on the assembly 1A in the shape of a mesh, and a method in which aerosol of a room-temperature liquid substance is generated using a supersonic humidifier or the like and then the carbon nanotube sheet 5A mounted on the assembly 1A in the shape of a mesh is exposed in the generated aerosol, for example.

When the exposure process is performed using particles of a room-temperature liquid substance, in order that the particles easily enter the carbon nanotube sheet 5A, a particle size of the room-temperature liquid substance (obtained by extracting ten particles stuck to the carbon nanotube sheet 5A at random, observing the extracted ten particles using an electron microscope and averaging the major diameters thereof) is preferably in a range from 5 nm to 200 μm, more preferably in a range from 7.5 nm to 100 μm, further preferably in a range from 10 nm to 50 μm.

In terms of improving the light transmittance and decreasing the sheet resistance, an average diameter of the structure in which the carbon nanotubes are gathered into the form of fibers (an average diameter of the plurality of structures) is preferably in a range from 1 μm to 300 μm, more preferably in a range from 3 μm to 150 μm, further preferably in a range from 5 μm to 50 μm.

It should be noted that the average diameter of the structure in which the carbon nanotubes are gathered into the form of fibers herein means an average diameter of the outer circumferences of the structures.

Figure 4:
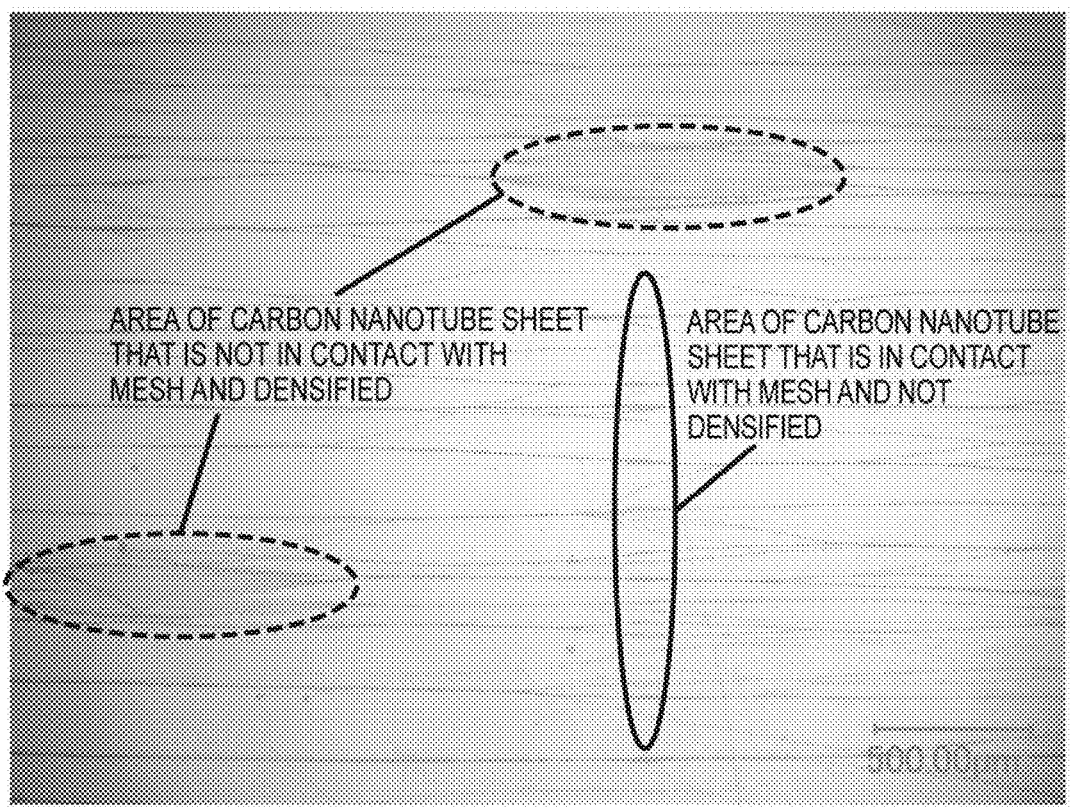
FIG. 4 is a photomicrograph of a carbon nanotube sheet subjected to a modification method according to the first exemplary embodiment.

According to the present modification method, since the contacting section 3A defined by the bumpy structure in which the threads constituting the mesh of the assembly 1A in the shape of a mesh are patterned is brought into contact with the carbon nanotube sheet 5A, the carbon nanotubes of a portion of the carbon nanotube sheet 5A in contact with the contacting section 3A are not bundled, and the carbon nanotubes of a portion of the carbon nanotube sheet 5A not in contact with the contacting section 3A (i.e., the fine pores 2A of the assembly 1A in the shape of a mesh and a portion corresponding to a root of the bumpy structure of the threads constituting the mesh) are bundled (see FIG. 4). When the carbon nanotube sheet is subjected to the bundling treatment in a free standing state (in a state that the carbon nanotube sheet is not mounted on a support structure of some sort, i.e., self-supported), shrinkage of the carbon nanotube sheet 5A in the width direction becomes outstanding. According to the present modification method, the carbon nanotube sheet 5A is subjected to the bundling treatment on the assembly 1A in the shape of a mesh having the plurality of fine pores (i.e., the non-contacting section having a predetermined opening diameter) 2A in the plan view of the mounting section 4A, so that occurrence of shrinkage of the carbon nanotube sheet 5A in the width direction is prevented.

According to the present modification method, the plurality of carbon nanotubes close to each other are bundled, and thereby voids are generated in the carbon nanotube sheet 5A. As a result, the light transmittance of the carbon nanotube sheet 5A is improved. Additionally, an effect such as decrease in the sheet resistance can be exhibited.

In contrast, when the carbon nanotube sheet is mounted on a support structure having no non-contacting sections and subjected to a treatment such as exposure to liquid vapor or the like, an entire surface of the carbon nanotube sheet near the support structure is brought into contact with the support structure. Accordingly, even when being subjected to a treatment of some sort, the carbon nanotube sheet only moves toward the support structure (in a thickness direction of the carbon nanotube sheet), and the carbon nanotubes are not gathered into a form of fibers. Consequently, an effect such as improvement in the light transmissivity and decrease in the sheet resistance cannot be exhibited.

Additionally, according to the present modification method, in accordance with a pattern of the non-contacting section including the fine pores 2A of the assembly 1A in the shape of a mesh, a portion in which the bundling treatment is performed and a portion in which the bundling treatment is not performed can be formed on the carbon nanotube sheet.

Modified Carbon Nanotube Sheet

According to the present modification method, a carbon nanotube sheet which is modified in terms of light transmittance, sheet resistance and the like, for example, can be obtained. The light transmissivity of the modified carbon nanotube sheet is preferably 70% or more. When the light transmissivity of the carbon nanotube sheet is 70% or more, the carbon nanotube sheet can be suitably used for a vehicle window that is required to allow for the visibility, a mirror that is required to provide an image with sharpness and the like, for example. The light transmissivity of the carbon nanotube sheet can be improved by, for example, increasing the area of voids in the carbon nanotube sheet. In order to increase the area of voids in the carbon nanotube sheet, an area of the non-contacting section may be enlarged by increasing the opening diameter of each of the fine pores in the assembly, for example.

The light transmissivity of the modified carbon nanotube sheet is preferably in a range from 70% to 100%, more preferably in a range from 80% to 99.9%.

It should be noted that the light transmissivity may be measured using an optical transmissivity measuring instrument including a visible-ultraviolet light source and a spectrometer, for example.

Adhesive Sheet

Hereinbelow, an adhesive sheet according to the first exemplary embodiment is described.

Figure 5:
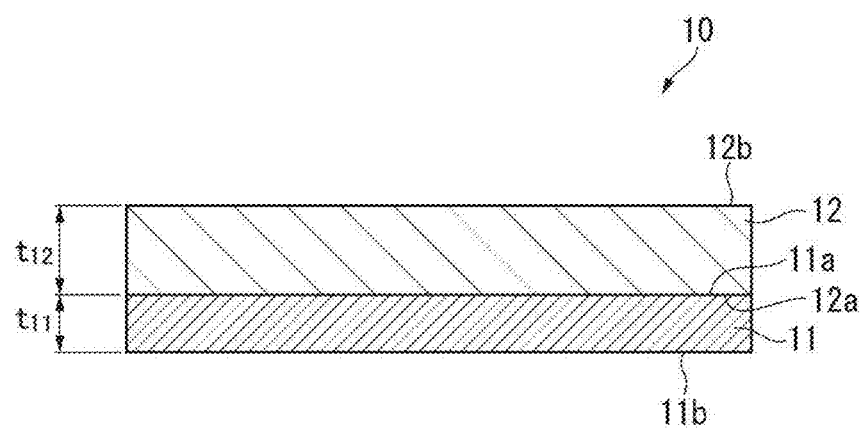
FIG. 5 is a schematic cross-sectional view of an adhesive sheet according to the first exemplary embodiment.

FIG. 5 is a schematic cross-sectional view of an adhesive sheet 10 according to the first exemplary embodiment.

As shown in FIG. 5, the adhesive sheet 10 according to the first exemplary embodiment includes a carbon nanotube sheet 11 and an adhesive agent layer 12 containing an adhesive agent. In the adhesive sheet 10 according to the first exemplary embodiment, a first surface 11a of the carbon nanotube sheet 11 (hereinafter, occasionally referred to as "first sheet surface 11a") is adjacent to a first surface 12a of the adhesive agent layer 12 (hereinafter, occasionally referred to as "first adhesive surface 12a").

The carbon nanotube sheet 11 is a carbon nanotube sheet subjected to the bundling treatment, which is obtained by the above-described modification method of a carbon nanotube sheet of the first exemplary embodiment. Accordingly, it is possible to improve the light transmittance of the carbon nanotube sheet 11.

A thickness $t_{11}$ of the carbon nanotube sheet 11 (see FIG. 5) is appropriately determined depending on the intended use of the adhesive sheet 10. For instance, in terms of the adhesiveness of the adhesive sheet 10 to be stuck to the adherend with the carbon nanotube sheet 11 being interposed between the adherend and the adhesive agent layer 12 and the facilitation of increasing the light transmissivity of the adhesive sheet 10, a thickness $t_{11}$ of the carbon nanotube sheet 11 is preferably in a range from 0.01 μm to 100 μm, more preferably in a range from 0.05 μm to 75 μm.

Adhesive Agent Layer

The adhesive agent of the adhesive agent layer 12 is not particularly limited. Examples of the adhesive agent include acrylic adhesive agent, urethane adhesive agent, rubber adhesive agent, polyester adhesive agent, silicone adhesive agent and polyvinylether adhesive agent. The adhesive agent of the adhesive agent layer 12 is preferably at least one selected from the group consisting of acrylic adhesive agent, urethane adhesive agent and rubber adhesive agent, more preferably an acrylic adhesive agent.

The acrylic adhesive agent includes acrylic polymer. The acrylic polymer includes a constituent unit derived from alkyl(meth)acrylate having a straight or branched alkyl group, a constituent unit derived from (meth)acrylate having a cyclic structure, or the like, for example. It should be noted that "(meth)acrylate" includes "acrylate" and "methacrylate", and the same applies to the other similar terms.

More specifically, the acrylic polymer includes a constituent unit (a1) derived from an alkyl(meth)acrylate (a1') having an alkyl group with 1 to 20 carbon atoms (hereinafter, also referred to as "monomer component (a1')"), a constituent unit (a2) derived from a functional-group-containing monomer (a2') (hereinafter, also referred to as "monomer component (a2')"), and a constituent unit (a3) derived from another monomer component (a3') different from the monomer component (a1') and the monomer component (a2').

The acrylic polymer may be a copolymer including at least one of the constituent unit (a1) and the constituent unit (a2), and two or more selected from the constituent units (a1) to (a3). In this case, the type of the copolymer is not particularly limited, but may be a block copolymer, a random copolymer or a graft copolymer.

The alkyl group in the monomer component (a1') preferably has 1 to 18 carbon atoms, more preferably has 2 to 14 carbon atoms, further preferably has 4 to 12 carbon atoms in terms of improvement in the adhesiveness and the like. When the carbon atoms of the alkyl group in the monomer component (a1') is within the above range, the interaction between the main chains of the acrylic polymer is disturbed and an influence of crystallization of the side chains is reduced to be small. Accordingly, a glass transition temperature of the acrylic polymer is maintained to be low, and the adhesiveness of the adhesive agent is easily improvable. Accordingly, it becomes easier to adjust the adhesive force of the adhesive sheet 10 measured after sticking a surface of the carbon nanotube sheet 11, which is opposite to the surface adjacent to the adhesive agent layer 12 (a second surface 11b (hereinafter occasionally referred to as "second sheet surface 11b")), to the adherend within a range described later.

Examples of the monomer component (a1') include methyl(meth)acrylate, ethyl(meth)acrylate, propyl(meth)acrylate, n-butyl(meth)acrylate, isobutyl(meth)acrylate, 2-ethylhexyl(meth)acrylate, n-octyl acrylate, isooctyl(meth)acrylate, decyl(meth)acrylate, lauryl(meth)acrylate, tridecyl (meth)acrylate and stearyl(meth)acrylate. Among the above examples of the monomer component (a1'), n-butyl(meth)acrylate, isobutyl(meth)acrylate, 2-ethylhexyl(meth)acrylate, n-octyl acrylate, isooctyl(meth)acrylate, decyl(meth)acrylate and lauryl(meth)acrylate are preferable, and n-butyl(meth)acrylate and 2-ethylhexyl(meth)acrylate are more preferable.

When the acrylic polymer is an acrylic copolymer including at least the constituent unit (a1), and at least one of the constituent units (a2) and (a3), the content of the constituent unit (a1) relative to the total constituent units (100 mass %) of the acrylic copolymer is preferably in a range from 50 mass % to 99.5 mass %, more preferably in a range from 55 mass % to 99 mass %, further preferably in a range from 60 mass % to 97 mass %, still more preferably in a range from 65 mass % to 95 mass %.

Examples of the monomer component (a2') include a hydroxy-group-containing monomer, carboxy-group-containing monomer, epoxy-group-containing monomer, amino-group-containing monomer, cyano-group-containing monomer, keto-group-containing monomer, and alkoxysilyl-group-containing monomer. Among the above examples of the monomer component (a2'), hydroxy-group-containing monomer and carboxy-group-containing monomer are preferable.

Examples of the hydroxy-group-containing monomer include 2-hydroxyethyl(meth)acrylate, 2-hydroxylpropyl (meth)acrylate, 2-hydroxybutyl(meth)acrylate, 3-hydroxybutyl(meth)acrylate and 4-hydroxybutyl(meth)acrylate, among which 2-hydroxyethyl(meth)acrylate is preferable.

Examples of the carboxy-group-containing monomer include a (meth)acrylic acid, maleic acid, fumaric acid and itaconic acid, among which a (meth)acrylic acid is preferable.

Examples of the epoxy-group-containing monomer include glycidyl(meth)acrylate. Examples of the amino-group-containing monomer include diaminoethyl(meth)acrylate. Examples of the cyano-group-containing monomer include acrylonitrile.

When the acrylic polymer is an acrylic copolymer including at least the constituent unit (a2), and in addition to this, at least one or more selected from the constituent units (a1) and (a3), the content of the constituent unit (a2) relative to the total constituent units (100 mass %) of the acrylic copolymer is preferably in a range from 0.1 mass % to 50 mass %, more preferably in a range from 0.5 mass % to 40 mass %, further preferably in a range from 1.0 mass % to 30 mass %, still more preferably in a range from 1.5 mass % to 20 mass %.

Examples of the monomer component (a3') include (meth)acrylate having a cyclic structure, vinyl acetate, and styrene. Examples of (meth)acrylates having a cyclic structure include cyclohexyl(meth)acrylate, benzyl(meth)acrylate, isobornyl(meth)acrylate, dicyclopentanyl(meth)acrylate, dicyclopentenyl(meth)acrylate, dicyclopentenyloxyethyl(meth)acrylate, imide(meth)acrylate and acryloylmorpholine.

When the acrylic polymer is an acrylic copolymer including at least one of the constituent units (a1) and (a2), and further including the constituent unit (a3), the content of the constituent unit (a3) relative to the total constituent units (100 mass %) of the acrylic copolymer is preferably more than 0 mass % and 40 mass % or less, more preferably more than 0 mass % and 30 mass % or less, further preferably more than 0 mass % and 25 mass % or less, still more preferably more than 0 mass % and 20 mass % or less.

It should be noted that one of the above monomer components (a1') may be singularly used or two or more thereof may be used in combination, one of the above monomer components (a2') may be singularly used or two or more thereof may be used in combination, and one of the above monomer components (a3') may be singularly used or two or more thereof may be used in combination.

The weight-average molecular weight of the acrylic polymer is preferably in a range from 50,000 to 2,500,000, more preferably in a range from 100,000 to 1,500,000. In general, as the weight-average molecular weight of acrylic polymer becomes smaller, the adhesive agent tends to be softened, and the adhesiveness of the adhesive agent tends to be increased. When the adhesive force of the adhesive sheet 10 measured after sticking the second sheet surface 11b to the adherend is to be adjusted within a range described later, the weight-average molecular weight of acrylic polymer is adjusted within the above-described range, so that it becomes easier to control the adhesive force.

The acrylic polymer may be cross-linked. A cross linker may be a known epoxy cross-linker, isocyanate cross-linker, aziridine cross-linker, metal chelate cross-linker or the like. In order to cross-link the acrylic polymer, the functional group derived from the monomer component (a2') may be used as a cross-linking point where the acrylic polymer is reacted with the cross-linker. It sometimes occurs that the sole use of the constituent unit (a2) is insufficient to easily control the physical property of the acrylic polymer. Therefore, in such a case, it is preferable that the acrylic polymer is an acrylic copolymer including the constituent unit (a2) and at least one of the constituent units (a1) and (a3). In general, as an additive amount of the cross linker becomes smaller, the adhesive agent tends to be softened, and the adhesiveness of the adhesive agent tends to be increased. The additive amount of the cross linker relative to 100 parts by mass of the acrylic copolymer is preferably 0.01 to 15 parts by mass, more preferably 0.05 to 10 parts by mass. When the adhesive force of the adhesive sheet 10 measured after sticking the second sheet surface 11b to the adherend is to be adjusted within a range described later, the additive amount of the cross linker may be adjusted within the above-described range, so as to easily control the adhesive force.

The composition for forming the adhesive agent layer 12 may contain additional component(s) as long as the effect(s) of the invention is not impaired. Examples of the additional component(s) to be contained in the composition for forming the adhesive agent layer include organic solvent, flame retardant, tackifier, ultraviolet absorber, antioxidant, preservative, antifungal agent, plasticizer, antifoaming agent and wettability modifier. When the tackifier is used, it becomes easier to adjust the adhesive force of the adhesive sheet 10 measured after sticking the second sheet surface 11b to the adherend within a range described later. The content of the tackifier is preferably 1 to 300 parts by mass relative to 100 parts by mass of the acrylic adhesive agent.

A thickness $t_{12}$ of the adhesive agent layer 12 (see FIG. 5) is appropriately determined depending on the intended use of the adhesive sheet 10. In general, the thickness $t_{12}$ of the adhesive agent layer 12 formed on the first sheet surface 11a of the carbon nanotube sheet 11 is adjusted in a range from 3 μm to 150 μm, preferably in a range from 5 μm to 100 μm. For instance, in order to achieve a sufficient adhesiveness while reducing the total thickness of the adhesive sheet 10, $t_{12}$ is preferably in a range from 1 μm to 20 μm, more preferably in a range from 2 μm to 9 μm.

In terms of sufficient fixation of the adhesive sheet 10 on the adherend and a performance of removing target materials such as contaminated substances in association with the adhesiveness of the adhesive sheet 10, the adhesive force of the adhesive sheet 10 measured after sticking the second sheet surface 11b to the adherend is preferably 8 N/25 mm or more. The adhesive force is more preferably 9 N/25 mm or more, further preferably 9.5 N/25 mm or more. Though, an upper limit of the adhesive force of the adhesive sheet 10 measured after sticking the second sheet surface 11b of the carbon nanotube sheet 11 on the adherend is not particularly specified, the upper limit is usually approximately 35 N/25 mm or less.

It should be noted that the adhesive force herein is a value obtained by measuring the adhesive force after the elapse of 30 minutes from the adhesion of the adhesive sheet 10 with the pulling rate of 300 mm/min. and the sheet width of 25 mm by 180-degree peeling method according to JIS Z0237: 2000.

When the adhesive sheet 10 does not include a base, the adhesive force of the adhesive sheet 10 measured after sticking the second sheet surface 11b to the adherend is usually influenced by extensibility of the adhesive agent layer 12 in the absence of the base. In view of the above, a polyethylene terephthalate film having a thickness of 25 μm as a base is stuck to a surface of the adhesive agent layer 12 opposite to the surface adjacent to the carbon nanotube sheet 11 (second surface 12b (hereinafter, occasionally referred to as "second adhesive surface 12b")) to obtain a sample, and an adhesive force of the sample is measured. According to the above modification method of the invention, the plurality of carbon nanotubes close to each other are bundled. Consequently, voids are generated in the carbon nanotube sheet. As a result, the adhesive agent in the adhesive agent layer on the second sheet surface 11b increasingly exudes through the voids. Accordingly, it becomes easier to adjust the adhesive force of the adhesive sheet 10 measured after sticking the second sheet surface 11b to the adherend within the range described above.

Production Method of Adhesive Sheet

A production method of the adhesive sheet 10 of the first exemplary embodiment includes a process of laminating a carbon nanotube sheet on an adhesive agent layer containing an adhesive agent. The production method of the adhesive sheet 10 is not particularly limited except the above-described process.

For instance, the adhesive sheet 10 is produced through the following processes.

A forest of carbon nanotubes is first formed on a substrate such as a silicon wafer by a known method. Subsequently, an end of the formed forest is twisted and drawn with tweezers or the like to produce the carbon nanotube sheet. Then, the produced carbon nanotube sheet is subjected to the modification method of the first exemplary embodiment to obtain the carbon nanotube sheet 11.

An adhesive agent layer is produced independently of the carbon nanotube sheet 11. The adhesive agent is first applied on a release sheet to form a coating film. The coating film is then dried to produce the adhesive agent layer 12.

The first sheet surface 11a of the carbon nanotube sheet 11 is stuck to (laminated on) the first adhesive surface 12a of the produced adhesive agent layer 12. Subsequently, the release sheet is removed to provide the adhesive sheet 10.

The adhesive sheet 10 of the first exemplary embodiment improves the handleability of the carbon nanotube sheet, and enables the carbon nanotube sheet to be easily applicable to a variety of uses.

Second Exemplary Embodiment

A second exemplary embodiment is different from the first exemplary embodiment in that an assembly in which a mounting section includes contacting sections continuous with each other and non-contacting sections continuous with each other is used as an assembly according to the modification method of a carbon nanotube sheet in the second exemplary embodiment.

Since the second exemplary embodiment is the same as the first exemplary embodiment in other points, the description thereof is omitted or simplified.

The assembly according to the modification method of the second exemplary embodiment preferably includes a plurality of continuous contacting sections (hereinafter, also referred to as "plurality of supporters") and a plurality of continuous non-contacting sections. The contacting sections and the non-contacting sections are arranged in stripes. The plurality of supporters, which are, for instance, arranged in stripes, intersect with the alignment direction of the carbon nanotubes in the carbon nanotube sheet in a plan view of the mounting section. A preferable angle defined between each of the plurality of supporters and the alignment direction of the carbon nanotubes is in a range from 60 to 90 degrees. More preferably, the plurality of supporters are substantially perpendicular to the alignment direction of the carbon nanotubes (i.e., intersect with the alignment direction of the carbon nanotubes with an angle therebetween in a range from 80 to 90 degrees). The maximum distance between the closest two points, one of the two points being a point on one of facing ends of adjacent ones of the contacting section and the other of the two points being a point on the other one of the facing ends, is always less than 10 mm. Lines constituting the stripes may be straight lines, wavy lines, curved lines, or bent lines, for example.

For the purpose of preventing shrinkage of the carbon nanotube sheet in the width direction, according to the second exemplary embodiment, the maximum distance between the closest two points, one of the two points being a point on one of facing ends of adjacent ones of the contacting section and the other of the two points being a point on the other one of the facing ends, is preferably always 5 mm or less, more preferably 2 mm or less, further preferably 1.5 mm or less. A lower limit of the maximum distance between the adjacent supporters among the plurality of supporters is not particularly specified, and may be determined as desired in view of the light transmissivity, adhesive force and the like of the carbon nanotube sheet. However, the lower limit of the maximum distance between the adjacent supporters among the plurality of supporters is 10 μm or more in general, preferably 50 μm or more, more preferably 100 μm or more.

Also in the second exemplary embodiment, the maximum distance $L_1$ is preferably more than 0 mm and less than 10 mm in the assembly as in the first exemplary embodiment described above. Such a structure can be easily obtained under the conditions that, when the plurality of supporters and the continuous non-contacting sections are arranged in stripes, the maximum distance between the closest two points, one of the two points being a point on one of facing ends of adjacent ones of the contacting section and the other of the two points being a point on the other one of the facing ends, is always less than 10 mm and the plurality of supporters are substantially perpendicular to the alignment direction of the carbon nanotubes in the carbon nanotube sheet in a plan view of the mounting section.

FIG. 6 schematically illustrates an example of an assembly according to the second exemplary embodiment, which shows part of the carbon nanotube sheet 5B supported by an assembly 1B having a plurality of continuous contacting sections 2B as a broken view.

The assembly 1B according to the modification method of the second exemplary embodiment includes a plurality of continuous contacting section 2B and continuous non-contacting sections 3B The plurality of contacting sections 2B are perpendicular to the alignment direction of the carbon nanotubes in the carbon nanotube sheet 5B in a plan view of a mounting section 4B (see FIG. 7). The distance $L_1$ between the adjacent contacting sections 2B is as noted above. The carbon nanotube sheet 5B mounted on the assembly 1B comes in contact with the contacting sections 2B (see FIG. 7).

Modifications of Exemplary Embodiment(s)

The scope of the invention is not limited to the above exemplary embodiments (first and second exemplary embodiments) but includes modifications and improvements compatible with the invention. It should be noted that the same reference signs are attached to the same members and the like as those of the above exemplary embodiment(s) and explanation thereof is omitted or simplified hereinbelow.

For instance, in the first exemplary embodiment, the assembly on which the carbon nanotube sheet is mounted may be an assembly including a bumpy structure defined by a plurality of independent contacting sections and the continuous non-contacting sections. Such an assembly is exemplified by a structure having a plurality of needles, a structure having a plurality of pillars and a structure in which a bumpy structure having a gentle slope or the like is erected on a base body. In this case, distal ends of the bumpy structure or the like defining the contacting sections which are in contact with the carbon nanotube sheet are preferably flat or curved. Examples of the shape of the needle or the pillar include a cylinder and a cone.

Further, for instance, the assembly on which the carbon nanotube sheet is mounted may be a film provided with irregularities by sandblasting and addition of filler, or an emboss film. As described above, an assembly including the plurality of fine pores and the plurality of contacting sections separated from each other, such as a metal mesh and a planar sphere packing assembly, also has the bumpy structure.

Examples of the assembly on which the carbon nanotube is mounted according to the first exemplary embodiment include, in addition to the assembly having fine pores and the assembly having the bumpy structure, an assembly that is an emboss film having continuous flat untreated sections as the contacting sections and a plurality of concaves separate from each other as the non-contacting section.

According to the modification method of the first and second exemplary embodiments, one carbon nanotube sheet or a plurality of carbon nanotube sheets laminated in advance are mounted on the assembly, and then subjected to the exposure process. However, in the mounting process, the plurality of carbon nanotube sheets may be laminated on the assembly and then subjected to the exposure process. When the plurality of carbon nanotube sheets are laminated, the effect of preventing shrinkage of the carbon nanotube sheets in the width direction is further enhanced.

For instance, in laminating the plurality of carbon nanotube sheets, after one of the carbon nanotube sheets is subjected to the mounting process and the exposure process and a plurality of the carbon nanotube sheets subjected to the processes are laminated to obtain a laminated body, the laminated body may be further subjected to the mounting process and the exposure process. Also in this case, the carbon nanotube sheets subjected to the processes may be laminated on the assembly in the mounting process.

When the plurality of carbon nanotube sheets are laminated, after one of the carbon nanotube sheets is mounted on the assembly and subjected to the exposure process, another carbon nanotube sheet may be laminated on the carbon nanotube sheet having been subjected to the exposure process and subjected to the exposure process, and such a procedure may be repeated to sequentially subject the laminated body to the exposure process.

In the adhesive sheet 10 of the first and second exemplary embodiments, the adhesive agent layer 12 may be curable. When the adhesive agent layer 12 is cured, impact resistance is improved to prevent deformation of the adhesive agent layer 12 caused by an impact.

When the adhesive agent layer 12 is not curable and the adhesive agent layer 12 does not have a property of keeping itself in the shape of a sheet, it is preferable that the adhesive sheet 10 in the first and second embodiments has a base.

In this case, the base may be laminated on the second adhesive surface 12b. In order to enhance the performance of sufficiently fixing the adhesive sheet 10 on the adherend and improve the performance of removing target materials such as contaminated substances using the adhesiveness of the adhesive sheet 10, the adhesive force of the adhesive sheet 10 measured after sticking the second sheet surface 11b on the adherend is preferably within the above range.

The base may be laminated on the second sheet surface 11b of the carbon nanotube sheet 11. In this case, the base can be stuck to the carbon nanotube sheet 11 due to the adhesiveness provided to the second sheet surface 11b by the influence of the adhesive agent exuding through the voids of the carbon nanotube sheet 11 subjected to the bundling treatment.

Examples of the base include paper, a resin film, a cured product of curable resin, a metal foil and a glass film. Examples of the resin film include a polyester resin film, polycarbonate resin film, polyimide resin film, polyolefin resin film, polyurethane resin film and acryl resin film.

A surface of the base opposite to the surface adjacent to the adhesive agent layer 12 or the carbon nanotube sheet 11 may be hard-coated using ultraviolet curable resin or the like to be further protected.

In the first and second exemplary embodiments, the adhesive sheet may further include a release material laminated on the second adhesive surface 12b of the adhesive agent layer 12. The adhesive sheet may further include a release material laminated on the second sheet surface 11b of the carbon nanotube sheet 11. The adhesive sheet may include a release material laminated on both the second adhesive surface 12b of the adhesive agent layer 12 and the second sheet surface 11b of the carbon nanotube sheet 11. When a release material is provided on any one of the second adhesive surface 12b of the adhesive agent layer 12 and the second sheet surface 11b of the carbon nanotube sheet 11, the adhesive sheet may include the base described above on the remaining one of the second adhesive surface 12b of the adhesive agent layer 12.

The release material is not particularly limited. For instance, in terms of handleability, the release material preferably includes a release base and a releasing agent layer formed by applying a releasing agent on the release base. The release material may include the releasing agent layer on only one of surfaces of the release base, or may include a releasing agent layer on both of the surfaces of the release base. Examples of the release base include a paper base, a laminate paper including the paper base and a thermoplastic resin such as polyethylene laminated on the paper base, and a plastic film. Examples of the paper base include glassine paper, coated paper and cast coated paper. Examples of the plastic film include polyester films such as polyethylene terephthalate film, polybutylene terephthalate film and polyethylene naphthalate film, and polyolefin films such as polypropylene film and polyethylene film. Examples of the releasing agent include olefin rein, rubber elastomer (e.g., butadiene resin and isoprene resin), long-chain alkyl resin, alkyd resin, fluorine resin and silicone resin.

A thickness of the release material is not particularly limited. The thickness of the release material is usually in a range from 20 μm to 200 μm and is preferably in a range from 25 μm to 150 μm.

A thickness of the releasing agent layer is not particularly limited. When the releasing agent layer is formed by applying a solution containing the releasing agent, the thickness of the releasing agent layer is preferably in a range from 0.01 μm to 2.0 μm, more preferably in a range from 0.03 μm to 1.0 μm.

When the plastic film is used as the release base, a thickness of the plastic film is preferably in a range from 3 μm to 50 μm, more preferably in a range from 5 μm to 40 μm.

The adhesive sheet 10 may include, in addition to the adhesive agent layer 12 (hereinafter, also referred to as "first adhesive agent layer" for the sake of the convenience), an adhesive agent layer (hereinafter, also referred to as "second adhesive agent layer" for the sake of the convenience) formed on the second sheet surface 11b of the carbon nanotube sheet 11. The adhesive agent contained in the first adhesive agent layer and the adhesive agent contained in the second adhesive agent layer may be the same, similar or totally different. A base may be provided to a surface of at least one of the first adhesive agent layer and the second adhesive agent layer opposite to the surface adjacent to the carbon nanotube sheet 11.

A thickness $t_{21}$ of the first adhesive agent layer and a thickness $t_{22}$ of the second adhesive agent layer are each independently preferably in a range from 3 μm to 150 μm, more preferably in a range from 5 μm to 100 μm. The sum of the thickness $t_{21}$ of the first adhesive agent layer and the thickness $t_{22}$ of the second adhesive agent layer (i.e., the total thickness of the adhesive agent layer) is preferably in a range from 10 μm to 300 μm, more preferably in a range from 20 μm to 200 μm.

The release material may be laminated to both of the first adhesive agent layer and the second adhesive agent layer.

EXAMPLES

The invention will be described in further detail with reference to Example(s). The invention is, however, by no means limited by Example(s).
Evaluation
Measurement of Light Transmissivity of Carbon Nanotube Sheet Light transmissivity of a carbon nanotube sheet obtained in each of Examples 1 to 3 and Comparatives 1 to 3 was measured using Haze meter (NDH2000, manufactured by NIPPON DENSHOKU INDUSTRIES CO., LTD.) according to JIS K7361. It should be noted that, in Comparatives 4 to 6, since the shrinkage properties of the carbon nanotube sheet were evaluated as defective, the present test was not performed. Table 1 shows the results.
Evaluation of Shrinkage Properties of CNT Sheet A width of the carbon nanotube sheet obtained in each of Examples 1 to 3 and Comparatives 4 to 6 was measured before and after the bundling treatment, and a shrinkage factor was calculated by the following calculation formula. Incidentally, in Comparative 1 to 3, since the bundling treatment was not performed, the shrinkage factor is considered as 0%. Table 1 shows the results.

Shrinkage factor=$(Wi-Wt)/Wi$

Wi: Width of the carbon nanotube sheet before the bundling treatment (an average length of the carbon nanotube sheet in a direction perpendicular to the alignment direction of the carbon nanotubes in the plan view).

Wt: Width of the carbon nanotube sheet after the bundling treatment (a length of the carbon nanotube sheet at a position where the carbon nanotube sheet shrank to the maximum degree in a direction perpendicular to the alignment direction of the carbon nanotubes in a plan view)
Measurement of Adhesive Force The adhesive force after the elapse of 30 minutes from the adhesion of the adhesive sheet in each of Examples 1 to 3, Comparative 1 to 3, and Reference 1 was measured with the pulling rate of 300 mm/m and the sheet width of 25 mm by 180-degree peeling method according to JIS Z0237:2000. In the preparation for the measurement, the surface of the carbon nanotube sheet opposite to the surface adjacent to the adhesive agent layer was stuck to the adherend. It should be noted that, in Comparative 4 to 6, since the adhesive sheet was not produced, the present test was not performed. Table 1 shows the results.

Example 1

Modification of Carbon Nanotube Sheet
(1) Preparation of Carbon Nanotube Forest and Production of Carbon Nanotube Sheet With use of thermal chemical vapor deposition (CVD) equipment including three furnaces and using argon gas as a carrier gas and acetylene as a carbon source, a carbon nanotube forest was formed on a silicon wafer by catalytic chemical vapor deposition. A height of the carbon nanotube forest was 300 μm.

An end of the formed carbon nanotube forest was twisted and drawn with tweezers into a carbon nanotube sheet having a width of 50 mm.
(2) Modification of Carbon Nanotube Sheet The carbon nanotube sheet was stuck to a surface of a metal mesh (a lattice shape, a thickness of a metal wire of the lattice: 50 μm, a length of one side of a square opening of the lattice: 700 μm) having a patterned bumpy structure.

Subsequently, isopropyl alcohol was sprayed onto the carbon nanotube sheet so that the carbon nanotube sheet was exposed to aerosol of isopropyl alcohol. The carbon nanotube sheet having an area, which was not in contact with the patterned bumpy structure of the metal mesh and subjected to the bundling treatment, was thus obtained.

Production of Adhesive Sheet (1) Preparation of Adhesive Composition 100 parts by mass (solid ratio) of acrylic ester resin as the base compound resin (n-butyl acrylate (BA)/ acrylic acid (AAc)=90.0/10.0 (mass ratio), weight-average molecular weight: 600,000, solvent: ethyl acetate, solid content concentration: 33.6 mass %), and 2.23 parts by mass (solid ratio) of an isocyanate cross-linker as a cross linker (manufactured by Nippon Polyurethane Industry Co., Ltd., product name: "CORONATE L", solid content concentration: 75 mass %) were blended, added with ethyl acetate, and stirred to be uniformly mixed, so as to prepare a solution of an adhesive composition having a solid content concentration of 31 mass %.

Production of Adhesive Sheet

The solution of the adhesive composition prepared as described above was applied to one of surfaces of a base material made of polyethylene terephthalate resin and having a thickness of 50 μm to form a coating film, and the coating film was dried to form an adhesive agent layer having a film thickness of 25 μm.

Next, the carbon nanotube sheet subjected to the bundling treatment on the metal mesh was stuck to the surface of the formed adhesive agent layer in a pressurized state so as to produce the adhesive sheet. Incidentally, after the adhesive sheet was released from the metal mesh, a surface of a polyethylene terephthalate film (manufactured by LINTEC Corporation, SP-PET381031) having a thickness of 38 μm and having been subjected to a silicone release treatment was stuck to the surface of the carbon nanotube sheet opposite to the surface to which the adhesive agent layer was stuck, so as to produce a release film.

Example 2

A carbon nanotube sheet was produced in the same manner as Example 1. An adhesive sheet of Example 2 was produced in the same manner as Example 1 except that the newly produced carbon nanotube sheet was further laminated on a non-modified carbon nanotube sheet on the metal mesh, (i.e., the number of layers of the carbon nanotube sheet was increased to two by laminating another carbon nanotube sheet), and thereafter the modification of the carbon nanotube sheet was performed.

Example 3

A carbon nanotube sheet was produced in the same manner as Example 1. An adhesive sheet of Example 3 was produced in the same manner as Example 1 except that the newly produced carbon nanotube sheet was further laminated on a non-modified carbon nanotube sheet on the metal mesh, (i.e., the number of layers of the carbon nanotube sheet was increased to three by laminating two more carbon nanotube sheets), and thereafter the modification of the carbon nanotube sheet was performed.

Reference 1

An adhesive sheet of Reference 1 was produced in the same manner as Example 1 except that the carbon nanotube sheet was not stuck to the surface of the adhesive agent layer.

Comparative 1

Instead of sticking the carbon nanotube sheet to the metal mesh, the carbon nanotube sheet was stuck to a release film (manufactured by LINTEC Corporation, SP-PET381031) placed on a flat plate. An adhesive sheet according to Comparative 1 was produced in the same manner as Example 1 except that the carbon nanotube sheet on the release film which was not subjected to the bundling treatment was stuck to the adhesive agent layer in a pressurized state.

Comparative 2

A carbon nanotube sheet was produced in the same manner as Example 1. An adhesive sheet according to Comparative 2 was produced in the same manner as Comparative 1 except that the newly produced carbon nanotube sheet was further laminated on a non-modified carbon nanotube sheet on the release film, (i.e., the number of layers of the carbon nanotube sheet was increased to two by laminating another carbon nanotube sheet).

Comparative 3

A carbon nanotube sheet was produced in the same manner as Example 1. An adhesive sheet according to Comparative 3 was produced in the same manner as Comparative 1 except that the newly produced carbon nanotube sheet was further laminated on a carbon nanotube sheet on the release film, (i.e., the number of layers of the carbon nanotube sheet was increased to three by laminating two more carbon nanotube sheets).

Comparative 4

The modification of the carbon nanotube sheet of Example 1 was performed to produce a carbon nanotube sheet subjected to the bundling treatment in the same manner as Example 1 except that the carbon nanotube sheet was held on two parallel sticks in a free-standing state and subjected to the bundling treatment by spraying isopropyl alcohol onto the held carbon nanotube sheet instead of sticking the carbon nanotube sheet to the metal mesh. Since the carbon nanotube sheet shrank by the bundling treatment, an adhesive sheet was not produced.

Comparative 5

A carbon nanotube sheet was produced in the same manner as Example 1. A carbon nanotube sheet subjected to the bundling treatment according to Comparative 5 was produced in the same manner as Comparative 4 except that the newly produced carbon nanotube sheet was further laminated on a non-modified carbon nanotube sheet held on two parallel sticks, (i.e., the number of layers of the carbon nanotube sheet was increased to two by laminating another carbon nanotube sheet), and thereafter subjected to the bundling treatment. Since the carbon nanotube sheet shrank by the bundling treatment, an adhesive sheet was not produced.

Comparative 6

A carbon nanotube sheet was produced in the same manner as Example 1. A carbon nanotube sheet subjected to the bundling treatment according to Comparative 6 was produced in the same manner as Comparative 4 except that the newly produced carbon nanotube sheet was further laminated on a non-modified carbon nanotube sheet held on two parallel sticks, (i.e., the number of layers of the carbon nanotube sheet was increased to three by laminating two more carbon nanotube sheets), and thereafter subjected to the bundling treatment. Since the carbon nanotube sheet shrank by the bundling treatment, an adhesive sheet was not produced.

TABLE 1

| | Number of layers of carbon nanotube sheet | bundling treatment | Light transmissivity of carbon nanotube sheet (%) | Shrinkage factor of carbon nanotube sheet (%) | Adhesive force (N/25 mm) |
|---|---|---|---|---|---|
| EX. 1 | 1 | yes | 94.87 | 0 | 13.9 |
| EX. 2 | 2 | yes | 90.48 | 0 | 12.1 |
| EX. 3 | 3 | yes | 86.61 | 0 | 10.3 |
| REF. 1 | 0 | — | — | — | 14.5 |
| COMP. 1 | 1 | no | 65.66 | 0 | 5.6 |
| COMP. 2 | 2 | no | 58.93 | 0 | 0.8 |
| COMP. 3 | 3 | no | 51.95 | 0 | 0.7 |
| COMP. 4 | 1 | yes | — | 18.4 | — |
| COMP. 5 | 2 | yes | — | 34.2 | — |
| COMP. 6 | 3 | yes | — | 55.3 | — |

As shown in Table 1, the carbon nanotube sheet in Examples 1 to 3 has light transmissivity that has been improved as compared to the carbon nanotube sheet in Comparatives 1 to 3 in which the bundling treatment was not performed. It is confirmed that the decrease in the adhesive force was smaller and the fixation to the adherend was stronger in Examples 1 to 3 as compared to Reference 1 in which the carbon nanotube sheet was not provided.

In Examples 1 to 3, since the bundling treatment was performed according to the modification method of the invention, shrinkage of the carbon nanotube sheet in the width direction was not observed regardless of the number of laminated layers. In contrast, in Comparatives 4 to 6, since the bundling treatment was performed while the carbon nanotube sheet was held in a free-standing state, shrinkage of the carbon nanotube sheet in the width direction was observed. As the number of laminated layers was increased, the more the carbon nanotube sheet shrunk.

Industrial Applicability

The invention claimed is:

1. A modification method of a carbon nanotube sheet comprising: mounting at least one carbon nanotube sheet on an assembly; and
    exposing the carbon nanotube sheet on the assembly to steam or particles of a substance that is liquid at room temperature, wherein
    the carbon nanotube sheet has a structure in which a plurality of carbon nanotubes are aligned preferentially in one direction in a plane of the carbon nanotube sheet,
    the assembly comprises a mounting section on which the carbon nanotube sheet is mounted, the mounting section comprises a non-contacting section that is not brought into contact with the carbon nanotube sheet and a contacting section that is brought into contact with the carbon nanotube sheet,
    $L_1$ is defined by a maximum distance across the non-contacting section between intersection points of a straight line extending in parallel with an alignment direction of the plurality of carbon nanotubes in a plan view of the mounting section and crossing over the non-contacting section with a border between the non-contacting section and the contacting section, while $L_2$ is defined by a maximum distance across the non-contacting section between intersection points of a straight line crossing over the non-contacting section and intersecting with the alignment direction of the plurality of carbon nanotubes in the plan view of the mounting section with the border between the non-contacting section and the contacting section,
    when $L_1$ is larger than $L_2$, at least $L_2$ is more than 0 mm and less than 10 mm,
    when $L_1$ is smaller than $L_2$, at least $L_1$ is more than 0 mm and less than 10 mm,
    and when $L_1$ equal to $L_2$, each of $L_1$ and $L_2$ is more than 0 mm and less than 10 mm.
2. The modification method of the carbon nanotube sheet according to claim 1, wherein at least one of the non-contacting section and the contacting section is separately disposed at plural positions.
3. The modification method of the carbon nanotube sheet according to claim 1, wherein the non-contacting section comprises a plurality of continuous non-contacting sections and the contacting section comprises a plurality of continuous contacting sections.
4. The modification method of the carbon nanotube sheet according to claim 1, wherein the non-contacting section of the assembly has fine pores.
5. The modification method of the carbon nanotube sheet according claim 1, wherein the assembly comprises a bumpy structure as the contacting sections.
6. The modification method of the carbon nanotube sheet claim 1, wherein the maximum distance $L_1$ is more than 0 mm and less than 10 mm in the assembly.
7. The modification method of the carbon nanotube sheet according to claim 3, wherein
    the assembly comprises the plurality of continuous contacting sections and the plurality of continuous non-contacting sections,
    the continuous contacting sections and the continuous non-contacting sections form a striped arrangement, in which a distance between closest two points, one of the two points being a point on one of facing ends of adjacent ones of the continuous contacting sections and the other of the two points being a point on the other one of the facing ends, is always less than 10 mm, and
    the striped arrangement crosses the alignment direction of the plurality of carbon nanotubes in the plan view.
8. The modification method of the carbon nanotube sheet according to claim m, further comprising:
    laminating the carbon nanotube sheet comprising a plurality of carbon nanotube sheets on the assembly; and
    then exposing the plurality of carbon nanotube sheets on the assembly to the steam or particles of the substance that is liquid at room temperature.
9. The modification method of the carbon nanotube sheet according to claim 1, wherein
    light transmissivity of a modified carbon nanotube sheet is 70% or more.

* * * * *